United States Patent [19]
Hsieh

[11] Patent Number: 5,918,997
[45] Date of Patent: Jul. 6, 1999

[54] SLEEVE FOR A MUSIC STAND

[76] Inventor: Wu-hong Hsieh, No. 46, Lane 59, Chungcheng Rd., Luchou Hsiang, Taipei Hsien, Taiwan

[21] Appl. No.: 09/111,818

[22] Filed: Jul. 8, 1998

[51] Int. Cl.$^6$ ..................................... F16B 7/10

[52] U.S. Cl. ..................... 403/104; 248/346.1; 403/110

[58] Field of Search ............................... 248/163.1, 166, 248/167, 434, 170, 171; 403/109.5, 104, 110, 377

[56] References Cited

U.S. PATENT DOCUMENTS 4,744,690  5/1988  Hsieh ...................................... 403/104

Primary Examiner—Ramon O. Ramirez
Attorney, Agent, or Firm—Welsh & Katz, Ltd.

[57] ABSTRACT

A sleeve for a music stand includes a first part and a second part, each of the two parts has two first lugs respectively extending in opposite directions therefrom, a second lug located between the two first lugs corresponding thereto. The two parts are mounted to the rod of the music stand and connected to each other by a fastening member pivotally connected to the two respective first lugs on the two parts.

2 Claims, 5 Drawing Sheets

500 # SLEEVE FOR A MUSIC STAND

FIELD OF THE INVENTION

The present invention relates to a sleeve mounted to a music stand, and more particularly, to a sleeve composed of two parts and being mounted to the rod of the music stand after a fastener has been fixedly mounted to the rod and both the fastener and the rod have been electrocoated.

BACKGROUND OF THE INVENTION

FIGS. 4 and 5 show a conventional music stand which includes a rod 50 having a plurality of slits 500 defined in the upper end thereof to which an upper fastener 53 is fixedly mounted by welding, a sleeve 80 movably mounted to the rod 50 and a lower fastener 52 mounted to a lower end of the rod 50. The upper fastener 53 has a cam means 531 connected thereto so as to clamp an inner rod (not shown) inserted into the upper end of the rod 50. The sleeve 80 has three lugs 84, 85 (only two are shown) and the lower fastener 52 has three lugs 520 to each of which a base leg 62 is pivotally connected, three trusses 70 respectively and pivotally connected to the three base legs 62 and the three lugs 84, 85 so as to form a tripod stand base. The sleeve 80 has a slit 81 defined through the peripheral wall thereof and two distal ends defining the slit 81 each have a lug 82/83 extending laterally therefrom so as to pivotally connect to a fastening means 90 which has a hook so as to hook on a ring member 91 located below the sleeve 80 on the rod 50 to position the sleeve 80 on the rod 50. When assembling the music stand, the sleeve 80 has to mount to the rod 50 before the upper fastener 53 is welded to the rod 50. Therefore, the outer elelctroplating of the upper fastener 53 could be peeled off during the welding process thus resulting in rusting. If the electroplating process is taken after the sleeve 80 is mounted to the rod 50, the music stand will occupy too much space and is difficult to be electrocoated.

Therefore, the present invention intends to provide a sleeve which is composed of two parts so that the rod and the upper fastener can be welded and electroplated before the sleeve is mounted to the rod so as to have a complete outer coating. The present invention has arisen to mitigate and/or obviate the disadvantage of the conventional music stand.

SUMMARY OF THE INVENTION

In accordance with one aspect of the present invention, a sleeve for a music stand which includes a rod having an upper fastener fixedly mounted thereto, a lower fastener mounted to the lower end of the rod, a plurality of legs pivotally connected to the lower fastener, and a sleeve movably mounted to the rod with trusses pivotally connected between the sleeve and the legs. The sleeve comprises a first part having a first lug and a second lug respectively extending radially and outwardly from two distal ends thereof, a third lug extending radially and outwardly from the peripheral wall thereof and located between the first lug and the second lug.

A second part has a fourth lug and a fifth lug respectively extending radially and outwardly from two distal ends thereof, a sixth lug extending radially and outwardly from the peripheral wall thereof and located between the fourth lug and the fifth lug. The first part and the second part are respectively mounted to the rod, wherein the second lug and the fifth lug are together connected to one of the trusses. The third lug and the sixth lug are connected the the other trusses respectively. A fastening member is pivotally connected to the first lug and the fourth lug.

An object of the present invention is to provide a sleeve for a music stand wherein the sleeve is composed of two parts so that the upper fastener is fixedly mounted to the rod and both are electroplated before the sleeve is mounted to the rod.

Further objects, advantages, and features of the present invention will become apparent from the following detailed description with appropriate reference to the accompanying drawings.

DETAILED DESCRIPTION OF THE PREFERRED EMBODIMENT

Figure 1:
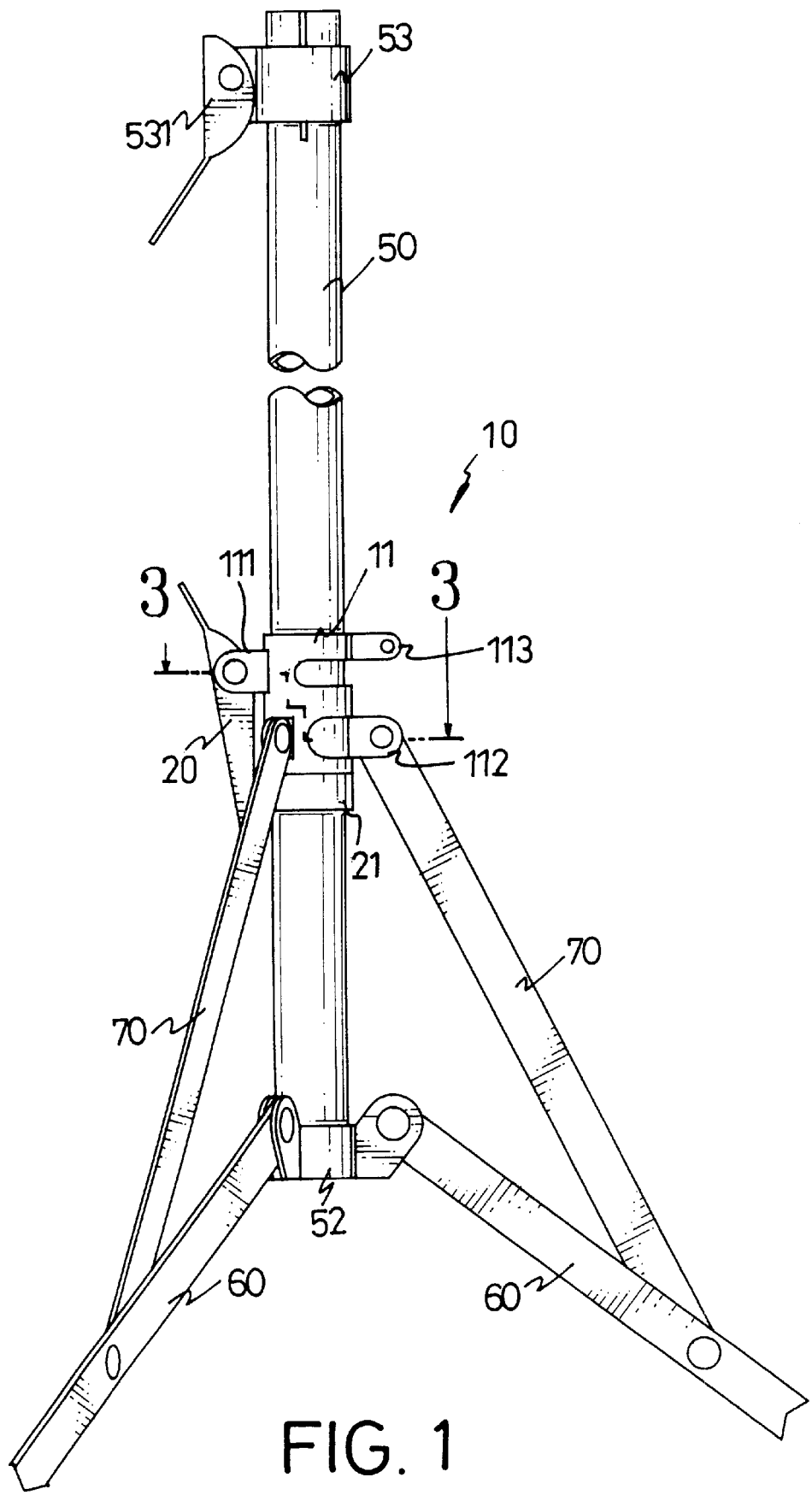
FIG. 1 is a side elevational view, partly in section, of the music stand with a sleeve in accordance with the present invention mounted to the rod of the music stand.
Figure 2:
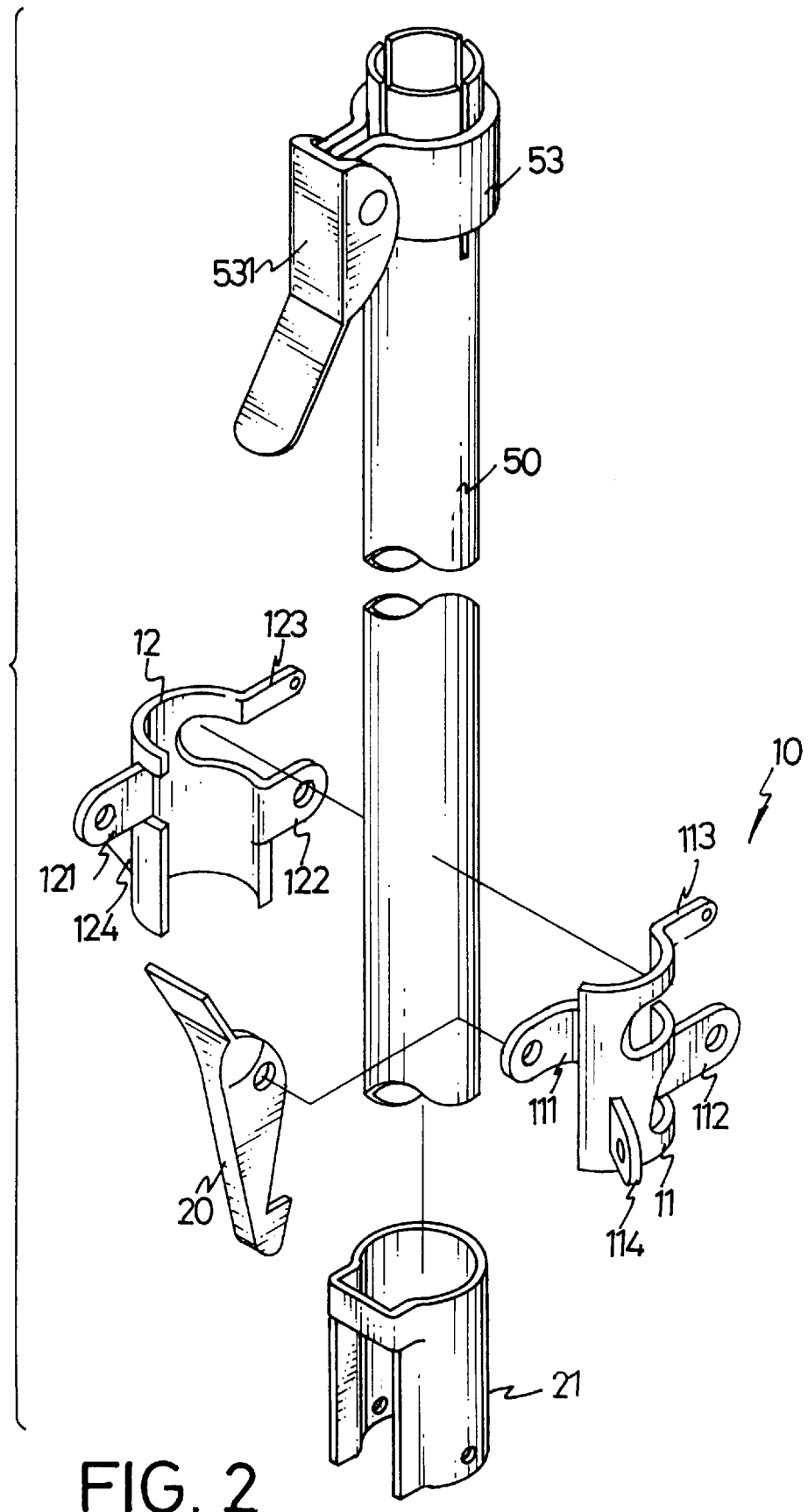
FIG. 2 is an exploded view of the rod and the sleeve in accordance with the present invention.
Figure 3:
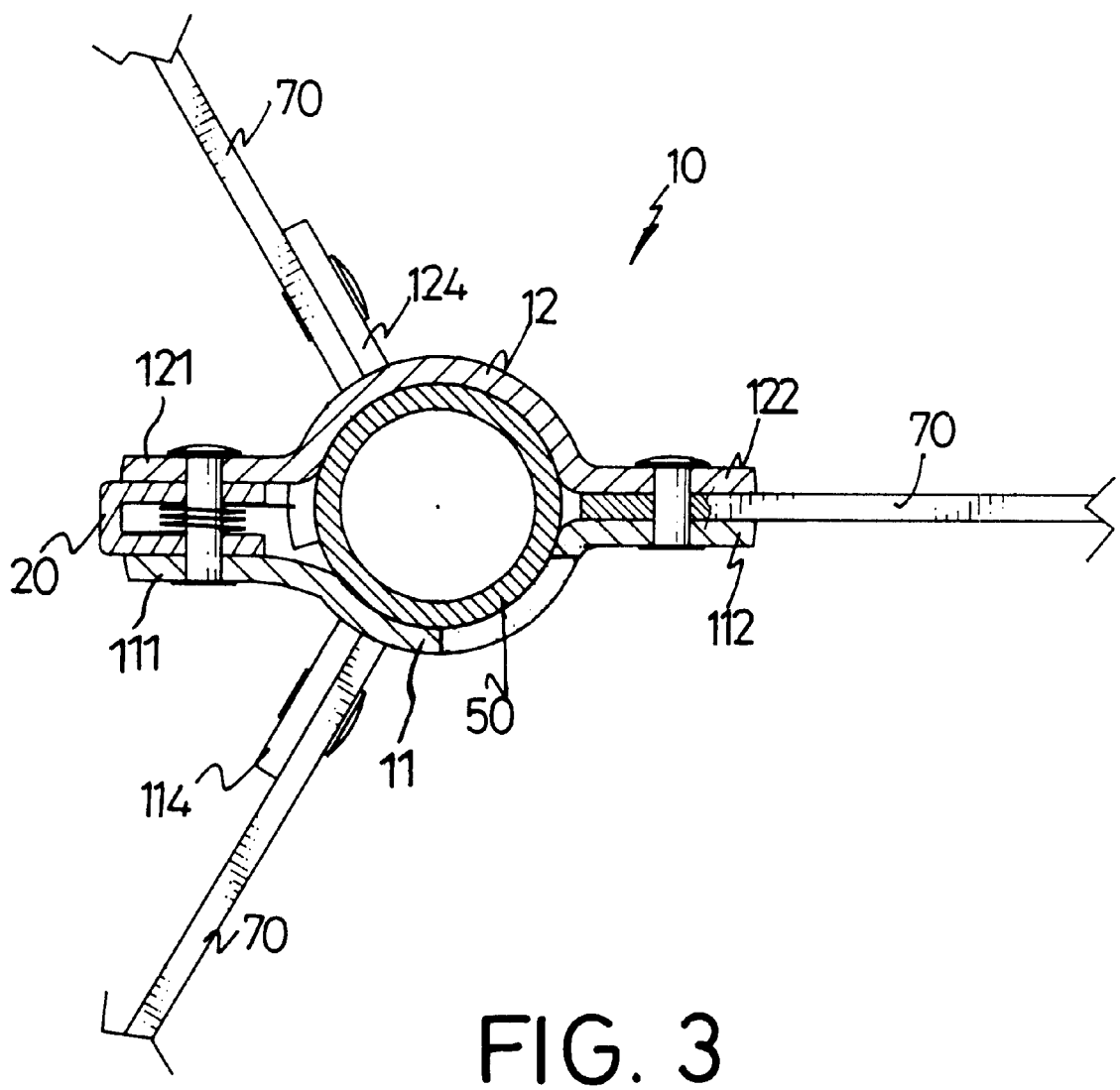
FIG.3 is a top cross-sectional view to illustrate engagement of the sleeve and the rod of the stand.
Figure 4:
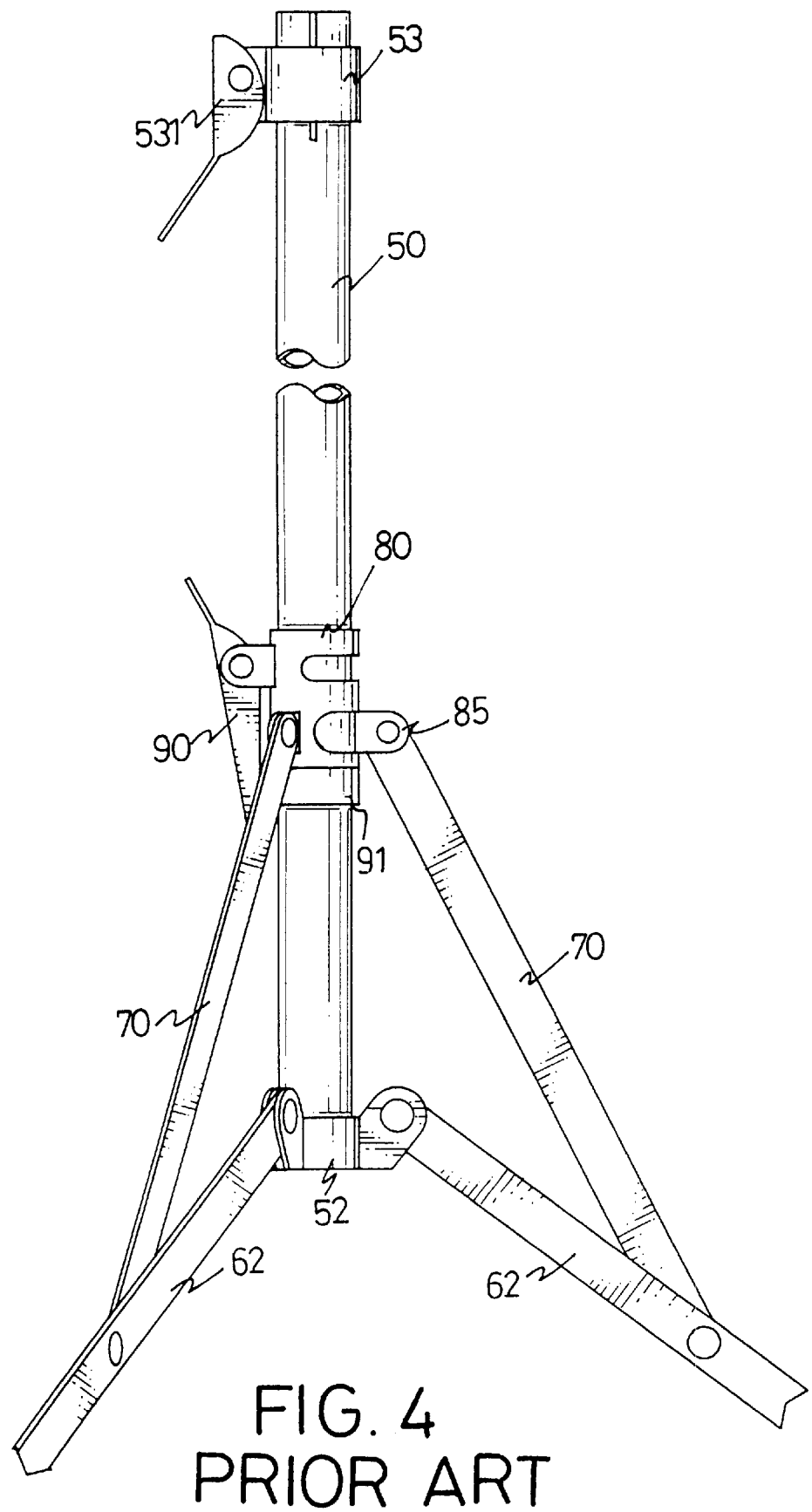
FIG. 4 is a side elevational view, partly in section, of a music stand with a conventional sleeve mounted to the rod of the music stand.
Figure 5:
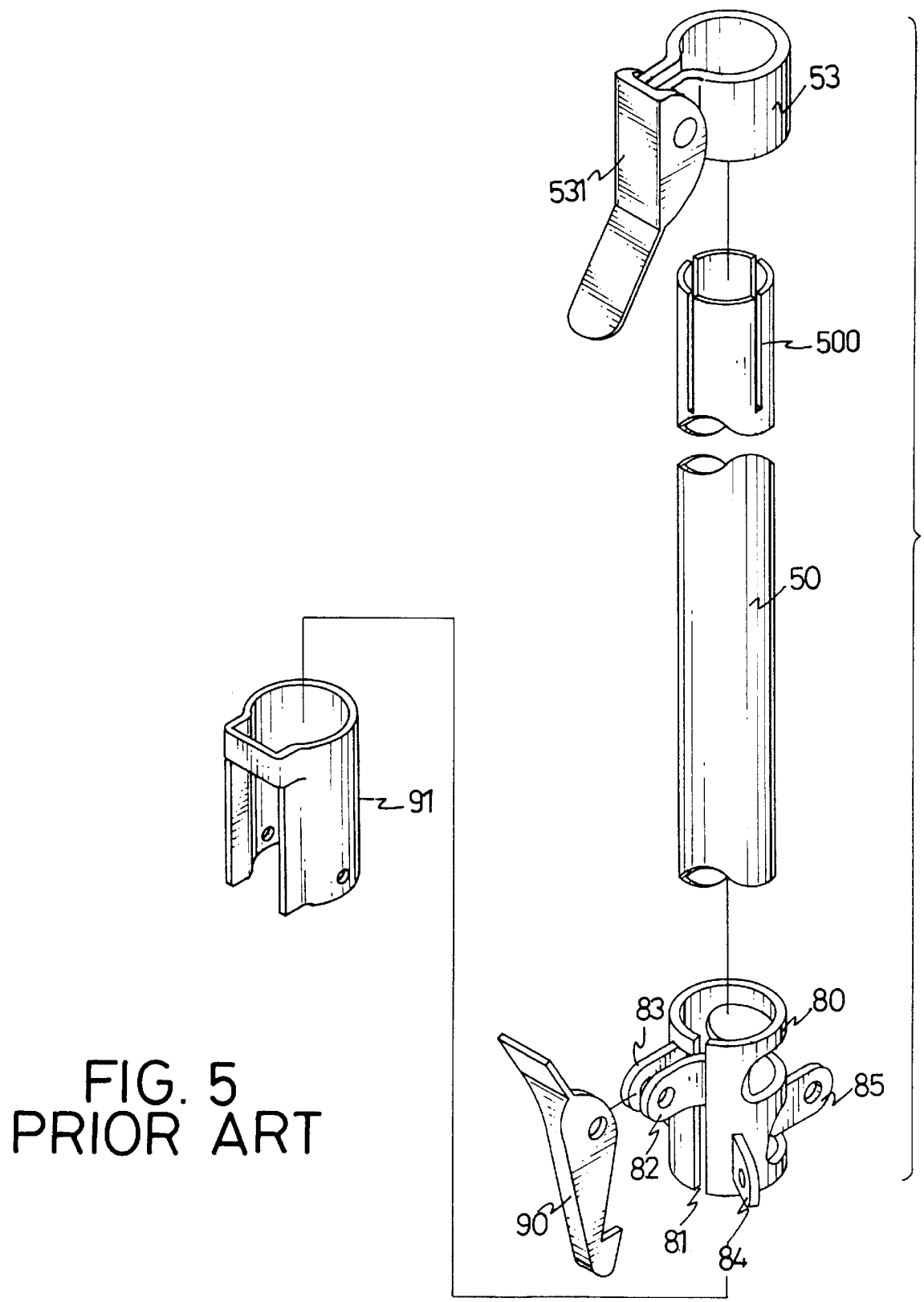
FIG. 5 is an exploded view of the rod and the conventional sleeve.

Referring to FIGS. 1 through 3, a sleeve for a music stand which includes a rod 50 having an upper fastener 53 fixedly mounted to the upper end thereof, a lower fastener 52 mounted to the lower end of the rod 50 and a plurality of legs 60 pivotally connected to the lower fastener 52. A sleeve 10 of the present invention is movably mounted to the rod 50 with three trusses 70 pivotally connected between the sleeve 10 and the legs 60. The sleeve 10 comprises a first part 11 and a second part 12, wherein both of the first part 11 and the second part 12 are a semi-circular plate and the first part has two a first lug 111 and a second lug 112 respectively extending radially and outwardly from two distal ends thereof, a third lug 114 extending radially and outwardly from a peripheral wall thereof and located between the first lug 111 and the second lug 112.

The second part 12 has a fourth lug 121 and a fifth lug 122 respectively extending radially and outwardly from two distal ends thereof, a sixth lug 124 extending radially and outwardly from a peripheral wall thereof and located between the fourth lug 121 and the fifth lug 122. A seventh lug 113 extends from the first part 10 and is located opposite to the first lug 111, an eighth lug 123 extending from the second part 12 and located opposite to the fourth lug 121.

The first part 11 and the second part 12 are respectively mounted to the rod 50, the second lug 112 and the fifth lug 122 together are connected to one of the trusses 70, and the third lug 114 and the sixth lug 124 are connected to the other two trusses 70 respectively. The seventh lug 113 is securely connected to the eighth lug 123. A fastening member 20 which has a hook formed to a lower end thereof and is pivotally connected to the first lug 111 and the fourth lug 121 so that when operating the fastening member 20 to hook to a ring member 21 on the rod and below the sleeve 10, the sleeve 10 is positioned on the rod 50. When disengaging the hook from the ring member 21, the sleeve 10 can be moved on the rod 50.

Accordingly, the rod 50 and the upper fastener 53 can be connected together and undergone an electroplating process, the sleeve 10 is then mounted to the rod 50 so that the electroplating layer of the upper fastener 53 and the rod 50 can be maintained.

Although the invention has been explained in relation to its preferred embodiment, it is to be understood that many other possible modifications and variations can be made without departing from the spirit and scope of the invention as hereinafter claimed.

What is claimed is:

1. A sleeve for a music stand which includes a rod having an upper fastener fixedly mounted thereto, a lower fastener mounted to a lower end of the rod, a plurality of legs pivotally connected to said lower fastener and a sleeve movably mounted to said rod with trusses pivotally connected between said sleeve and said legs, said sleeve comprising:

a first part having a first lug and a second lug respectively extending radially and outwardly from two distal ends thereof, a third lug extending radially and outwardly from a peripheral wall thereof and located between said first lug and said second lug, a second part having a fourth lug and a fifth lug respectively extending radially and outwardly from two distal ends thereof, a sixth lug extending radially and outwardly from a peripheral wall thereof and located between said fourth lug and said fifth lug, said first part and said second part respectively mounted to said rod and said second lug and said fifth lug together adapted to be connected to one of said trusses, said third lug and said sixth lug adapted to be connected to said the other trusses respectively, and a fastening member pivotally connected to said first lug and said fourth lug.

2. The sleeve as claimed in claim 1 further comprising a seventh lug extending from said first part and located opposite to said first lug, an eighth tug extending from said second part and opposite to said fourth lug, said seventh lug connected to said eighth lug.

\* \* \* \* \*